UNITED STATES PATENT OFFICE 2,371,068

TREATMENT OF ORGANO-SILICOLS AND PRODUCTS THEREOF

Eugene G. Rochow, West Albany, N. Y., assignor to General Electric Company, a corporation of New York No Drawing. Application April 30, 1940,
Serial No. 332,605

6 Claims. (Cl. 260—2)

The present invention relates to the treatment of organo-silicols and to the products thereof. More particularly the invention is concerned with new and improved methods for effecting condensation or dehydration of organo-silicols, including the products thereby obtained.

Organo-silicols (hereafter for brevity referred to merely as "silicols") may be considered as being organo-silicon hydroxides, that is, compounds of the general type $$R_xSi(OH)_{4-x}$$

where R is alkyl, aryl or other organic radical or radicals capable of direct union with the silicon atom, and $x$ is a number not exceeding 3. Dehydration products of silicols broadly may be termed "organo-siloxanes or organo-polysiloxanes" (organo-substituted silicon oxides), that is, compounds of the general type $$R_xSiO_{\frac{4-x}{2}}$$

and their polymers, where R and $x$ have the meanings given in the preceding sentence. The name "siloxane" as used generally herein, is intended to include within its meaning dehydration or condensation products of the above, generically defined silicols.

Silicols, for example alkyl or aryl silicols, may be produced, for instance, by hydrolysis of the corresponding halides, and thereafter condensed or dehydrated to obtain the corresponding polymeric products. For example, a mixture of $CH_3Si(OH)_3$, $(CH_3)_2Si(OH)_2$ and $(CH_3)_3SiOH$ in the proportions required to give the desired methyl-to-silicon ratio may be obtained by hydrolyzing a mixture of the corresponding chlorides as described more fully in my copending application Serial No. 287,787, filed August 1, 1939. Polymeric methyl siloxanes are produced by condensation of these silicols. The condensation proceeds rapidly at first, yielding liquid or semi-solid initial or intermediate condensation products, and then more slowly as the number of available hydroxyl groups decreases.

In condensing some silicols to siloxanes or polysiloxanes using heat alone to effect condensation, the liquid products of partial condensation sometimes are of such high volatility that a large amount of the silicol evaporates before condensing and polymerizing to form larger molecules that are non-volatile at the condensation temperature. This effect is particularly noticeable when the proportion of substituted groups, e. g., methyl groups, is high and the number of hydroxyl groups is correspondingly low.

I have discovered that the above difficulties in the condensation of a silicol may be obviated, and larger yields of dehydration products (siloxanes) obtained, by carrying out the condensation reaction in the presence of a dehydrating agent. Thus, taking dimethyl silicol as illustrative of a silicol, the dehydrating agent removes the water from the reaction.

$$x(CH_3)_2Si(OH)_2 \rightarrow [(CH_3)_2SiO]_x + xH_2O$$

and causes the reaction to proceed much more rapidly at a given condensation temperature. In the reaction illustrated above $x$ means a number greater than 1.

Any dehydrating agent may be employed in carrying this invention into effect. Illustrative examples of such agents, that is, agents capable of adsorbing or of chemically combining with the water in the reaction mass, are the esters of boric acid, e. g., alkyl borates such as methyl, ethyl, propyl, isopropyl, butyl, isobutyl, amyl, hexyl, heptyl, etc., borates; aryl borates, e. g., phenyl, tolyl, xylyl, naphthyl, etc., borates; substituted ortho-borates, e. g., diethyl phenyl borate, di-isobutyl m-tolyl borate, etc.; antimony halides, e. g., antimony trichloride and tribromide, antimony pentachloride and pentabromide, etc.; oxides, halides and oxyhalides of phosphorus, e. g., phosphorus pentoxide, phosphorus trichlorides and tribromides, phosphorus pentachlorides and pentabromides, phosphorus dibromotrichloride, phosphorus oxychlorides and oxybromides, phosphorus oxybromodichloride, etc.; sulfuric acid; boron halides, e. g., boron trichloride and trifluoride; Portland cement; amines, e. g., ethylene diamine, diethylene triamine, triethylene tetramine, etc.; activated alumina; activated silica gel; and similar substances.

Of course it will be understood that the amount of dehydrating agent may be varied widely, depending upon such factors as, for example, the particular silicol to be dehydrated, the extent and rapidity of dehydration desired, the kind of dehydrating agent, the temperature of dehydration, the use to which the product of dehydration is to be placed, etc. Ordinarily, however, the amount of dehydrating agent will not exceed, by weight, the amount of silicol to be dehydrated and may be as little as from 0.1 to 10 or 20% by weight thereof.

In order that those skilled in the art better may understand how this invention may be carried into effect, the following illustrative examples thereof are given:

Example 1

A partly condensed, liquid methyl silicol containing an average of about 2 methyl groups per silicon atom was mixed with one-half its volume of ethyl borate. The resulting mixture was heated at 190° C., yielding a solid polymeric body in 10 minutes. When the same liquid methyl silicol is heated in the absence of ethyl borate or other dehydrating agent, it requires heating for several hours at 190° C. to convert it to solid state, during which time a large amount of silicol is lost by evaporation.

Similarly, a mixture of the above liquid methyl silicol having incorporated therein 20% by volume of ethyl borate is converted into a solid polymeric body when heated for 30 minutes at 170° C. The same liquid methyl silicol, in the absence of a dehydrating agent, requires heating for several days at 170° C. to form a solid condensation product or polymer.

A methyl silicol containing an average of 1.6 methyl groups per silicon atom showed a very gradual increase in viscosity when heated at 150° C., but solidified in 15 minutes at this temperature when 10% by volume of ethyl borate was added.

The esters of boric acid, e. g., ethyl borate, function as dehydrators by reacting thus with the water split off from the silicol:

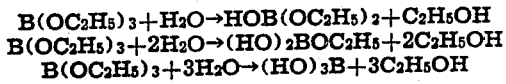

The boric acid (or intermediate product) remains dissolved in the polymeric silicone, while the ethyl alcohol evaporates at the condensation temperatures. In the case of the higher alkyl and the aryl borates, all the non-volatile reaction products of the borate with water may remain dissolved or dispersed in the solid silicone.

Example 2

A liquid methyl silicol containing an average of 1.6 methyl groups per silicon atom showed some increase in viscosity when heated for 15 days at 175° C. However, when a small amount of the order of 1 to 5% by weight (of the silicol) of one of the following dehydrating agents was incorporated with the liquid silicol, solid polymers or condensation products formed as follows:

(a) Antimony pentachloride yielded a discolored, solid polymer immediately at room temperature.
(b) Sulfuric acid yielded a somewhat discolored, solid polymer immediately at room temperature.
(c) Ethylene diamine formed a solid polymer when heated for 1 hour at 120° C.

It will be understood, of course, that my invention is not limited to the treatment of the specific silicol, methyl silicol, named in the above illustrative examples and that any silicol may be partly or substantially completely condensed to a siloxane or polysiloxane while admixed with a dehydrating agent. Illustrative examples of other silicols which thus may be treated are the halogenated aryl silicols, specifically the chlorinated phenyl silicols, disclosed in my copending application Serial No. 296,819, filed September 27, 1939; the methyl aryl silicols, specifically the methyl phenyl silicols, shown in my copending application Serial No. 332,099, filed April 27, 1940; the aroxy silicols, more particularly the aroxyaryl silicols, e. g., the phenoxyphenyl silicols, numerous examples of which are given in my copending application Serial No. 332,098, filed April 27, 1940; the mixtures of ethyl silicols shown in my copending application Serial No. 332,097, filed April 27, 1940; and the silicols from which are derived the known siloxanes, e. g., the propyl, benzyl (aralkyl) and tolyl (alkaryl) polysiloxanes disclosed in my copending application Serial No. 287,787; filed August 1, 1939.

It also will be understood that my invention is not limited to the specific dehydrating agents named in the illustrative examples, and that any agent effective in accelerating the removal of water from the silicol may be employed, for instance dehydrators such as those mentioned by way of illustration in the fore part of this specification. The dehydrating agent may be a homogeneous dehydrator, that is, one which either in its initial state or in the form of its hydrolysis products does not separate as a distinct phase from the silicol or the condensation product. Examples of such dehydrators are the esters of boric acid, specifically ethyl borate. Or, the dehydrator may be a heterogeneous dehydrator, e. g., Portland cement or sulfuric acid, that is, a dehydrating agent which either in its initial state or as a reaction product with water separates from the silicol or the dehydration product. I prefer to use a homogeneous dehydrator, specifically an ester of boric acid. In some cases it may be advantageous to use an alkyl borate in effecting dehydration of an alkyl-substituted silicon hydroxide (alkyl silicol) and an aryl borate in dehydrating (condensing) an aryl-substituted silicon hydroxide (aryl silicol).

From the foregoing description it will be seen that my invention provides a rapid and economical method for partly or completely dehydrating or condensing a silicol to a siloxane. The invention provides compositions of matter comprising a silicol, e. g., a methyl silicol, having incorporated therewith a dehydrating agent. It also provides new and useful products of dehydration of a mixture of a silicol and a dehydrating agent, e. g., an ester of boric acid such as ethyl borate. These new dehydration products, with or without the addition of modifying agents (examples of which are given in my above-identified copending applications), may be used in industry in such applications as mentioned by way of illustration in the said copending applications. Dehydration products of mixtures of silicols and esters of boric acid are particularly useful as electrically insulating compositions.

What I claim as new and desire to secure by Letters Patent of the United States is:

1. The method of effecting condensation of an organo-silicol selected from the group consisting of alkyl, aralkyl, alkylaryl, aroxyaryl and halogenated and non-halogenated aryl and alkaryl silicols which comprises carrying out the condensation reaction while the organo-silicol is admixed with an ester of boric acid.

2. The method of effecting condensation of an organo-silicol selected from the group consisting of alkyl, aralkyl, alkylaryl, aroxyaryl and halogenated and non-halogenated aryl and alkaryl silicols which comprises condensing the silicol while admixed with an alkyl borate.

3. A method as in claim 2 wherein the alkyl borate is ethyl borate.

4. The method of condensing an alkyl silicol which comprises heating said silicol to effect dehydration thereof while the said silicol is mixed with an alkyl borate.

5. The method of condensing a methyl silicol which comprises effecting dehydration thereof by heat while the said silicol is admixed with ethyl borate.

6. The method of condensing an aryl silicol which comprises effecting dehydration of the said silicol by heat while admixed with an aryl borate.

EUGENE G. ROCHOW.